United States Patent
Lim

(10) Patent No.: US 9,816,749 B2
(45) Date of Patent: Nov. 14, 2017

(54) REFRIGERATOR AND METHOD FOR CONTROLLING THE SAME

(75) Inventor: Hyoung Keun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1162 days.

(21) Appl. No.: 13/520,058

(22) PCT Filed: Jan. 19, 2011

(86) PCT No.: PCT/KR2011/000380
§ 371 (c)(1),
(2), (4) Date: Jun. 29, 2012

(87) PCT Pub. No.: WO2011/090309
PCT Pub. Date: Jul. 28, 2011

(65) Prior Publication Data
US 2012/0272674 A1    Nov. 1, 2012

(30) Foreign Application Priority Data

Jan. 22, 2010    (KR) .................. 10-2010-0006024

(51) Int. Cl.
*F25B 1/00* (2006.01)
*F25B 41/04* (2006.01)
(Continued)

(52) U.S. Cl.
CPC .......... *F25D 29/00* (2013.01); *F25B 2400/19* (2013.01); *F25B 2600/0251* (2013.01);
(Continued)

(58) Field of Classification Search
CPC .................. F25D 29/00; F25D 11/022; F25B 2600/2507; F25B 2400/19; F25B 2600/025; Y02B 40/32
See application file for complete search history.

(56) References Cited

U.S. PATENT DOCUMENTS 3,448,916 A * 6/1969 Fraser .................. F04C 28/24
                                                417/228
4,441,335 A * 4/1984 Bonne .................. F25B 13/00
                                                137/563
(Continued)

FOREIGN PATENT DOCUMENTS

DE    102006015989 A1    10/2007
EP        2019275 A1     1/2009
(Continued)

*Primary Examiner* — Kun Kai Ma
(74) *Attorney, Agent, or Firm* — Birch, Stewart, Kolasch & Birch, LLP

(57) ABSTRACT

The present invention relates to a refrigerator and a method for controlling a refrigerator, and more particularly to a refrigerator and a method for controlling a refrigerator in which unnecessary operation of a compressor is prevented for saving power consumption of the refrigerator. The refrigerator includes a compressor, a refrigerating chamber evaporator and a freezing chamber evaporator connected to the compressor, a refrigerant valve for guiding refrigerant to the refrigerating chamber evaporator or the freezing chamber evaporator, and a control unit for controlling the refrigerant valve such that the refrigerant valve blocks or introduces the refrigerant to cause an inside pressure of the freezing chamber evaporator to be elevated higher than an inside pressure of the refrigerating chamber evaporator during evaporation at the refrigerating chamber evaporator for the compressor to draw in the refrigerant remained in the freezing chamber evaporator which did not evaporate.

11 Claims, 9 Drawing Sheets

(51) Int. Cl.
  *F25D 29/00*    (2006.01)
  *F25D 11/02*    (2006.01)
(52) U.S. Cl.
  CPC ..... *F25B 2600/2507* (2013.01); *F25D 11/022* (2013.01); *Y02B 40/32* (2013.01)

(56) References Cited

U.S. PATENT DOCUMENTS

| | | | | |
|---|---|---|---|---|
| 6,253,561 B1* | 7/2001 | Imakubo | ............... | F25B 5/04 62/158 |
| 6,370,895 B1* | 4/2002 | Sakuma | ............... | F25B 5/02 62/152 |
| 6,397,608 B1* | 6/2002 | Sakuma | ............... | F25B 5/02 62/158 |
| 2002/0043073 A1* | 4/2002 | Park | ............... | F25B 5/00 62/231 |
| 2002/0134095 A1* | 9/2002 | Temmyo | ............... | F25B 5/02 62/179 |
| 2005/0086952 A1* | 4/2005 | Nonaka | ............... | F25D 11/022 62/129 |
| 2005/0103029 A1* | 5/2005 | Kawahara | ............... | F25D 29/008 62/126 |
| 2006/0144063 A1* | 7/2006 | Oh | ............... | F25B 49/022 62/200 |
| 2007/0113567 A1* | 5/2007 | Ahn | ............... | F25D 17/042 62/186 |
| 2009/0113904 A1* | 5/2009 | Yun | ............... | F25B 5/02 62/115 |
| 2009/0173086 A1* | 7/2009 | Guffler | ............... | F25B 5/02 62/113 |
| 2009/0282849 A1* | 11/2009 | Fujimoto | ............... | F25B 1/10 62/228.5 |
| 2013/0340457 A1* | 12/2013 | Keres | ............... | F25B 49/005 62/129 |
| 2015/0000318 A1* | 1/2015 | Pinto | ............... | F25B 1/00 62/228.1 |

FOREIGN PATENT DOCUMENTS

| | | |
|---|---|---|
| KR | 10-2009-0046152 A | 5/2009 |
| WO | WO 2009/051030 A1 | 5/2009 |

\* cited by examiner

[Fig. 1]
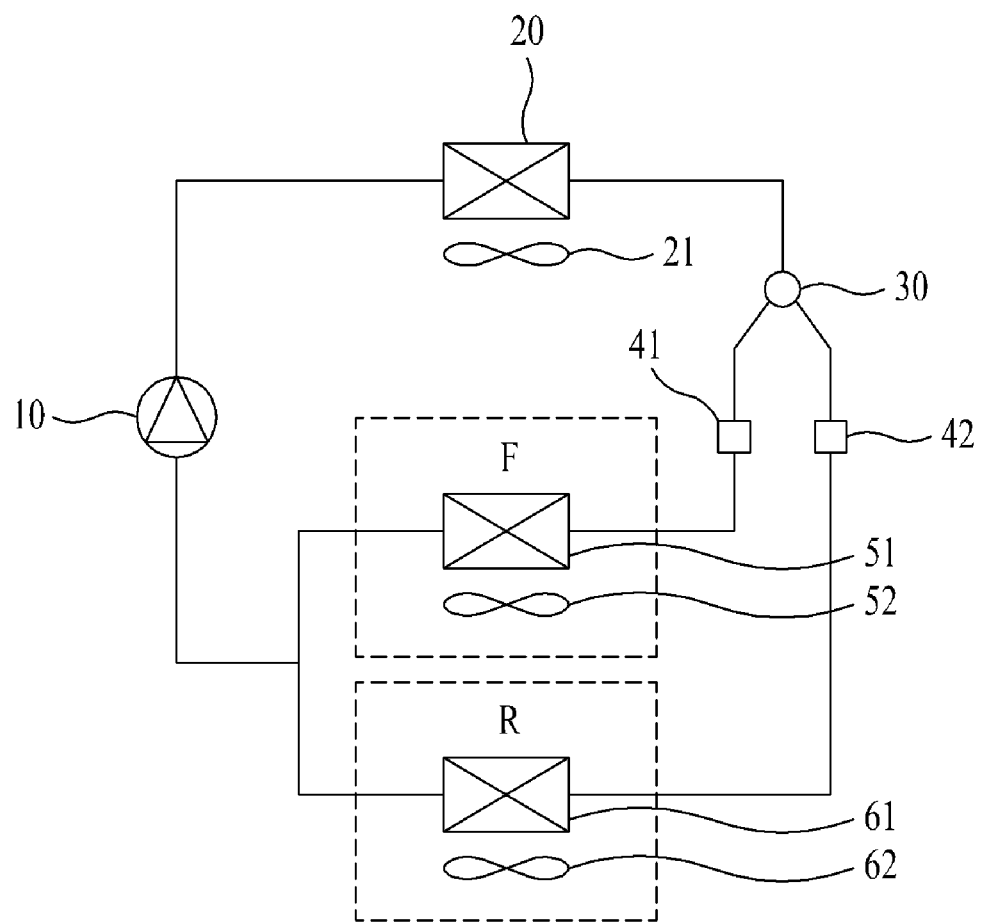

[Fig. 2]
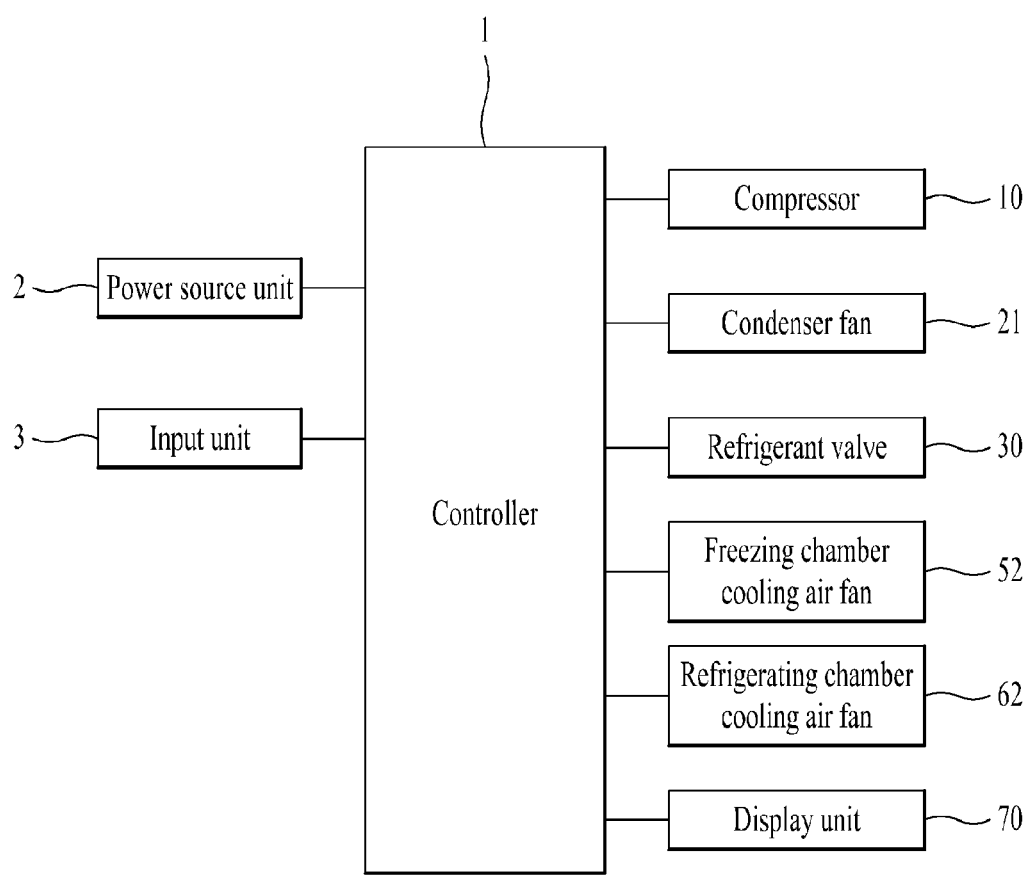

[Fig. 3]
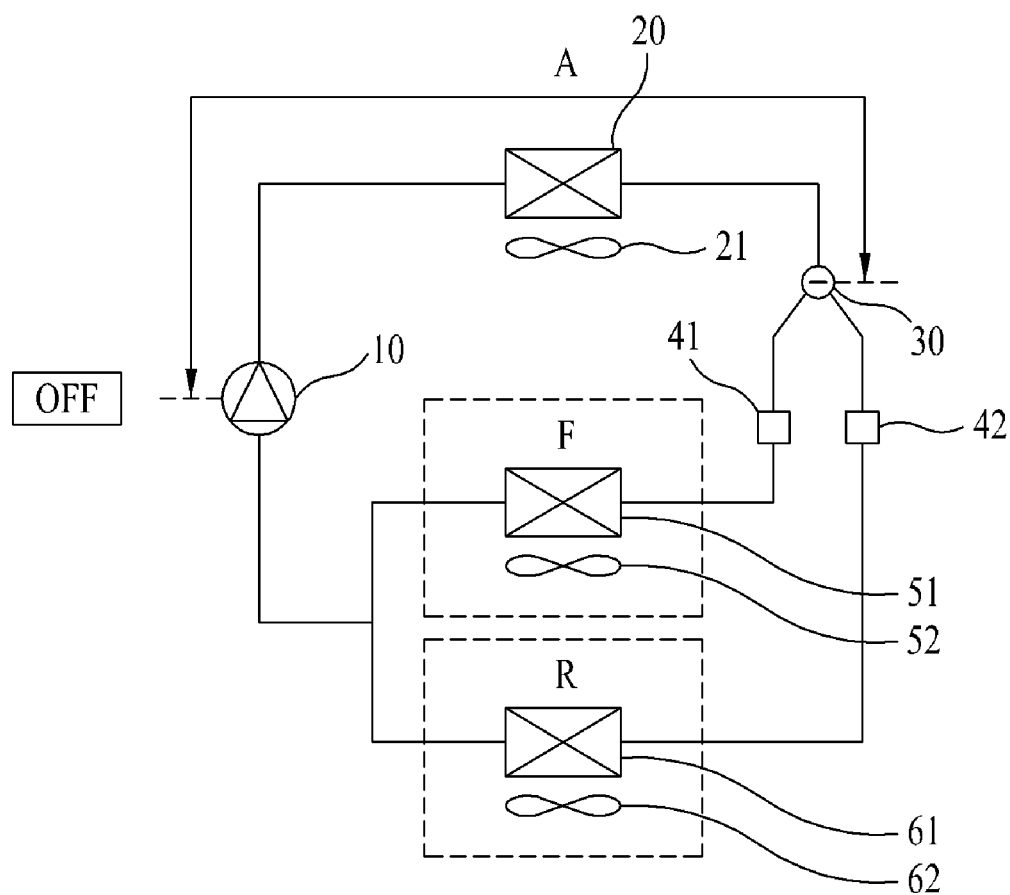

[Fig. 4]
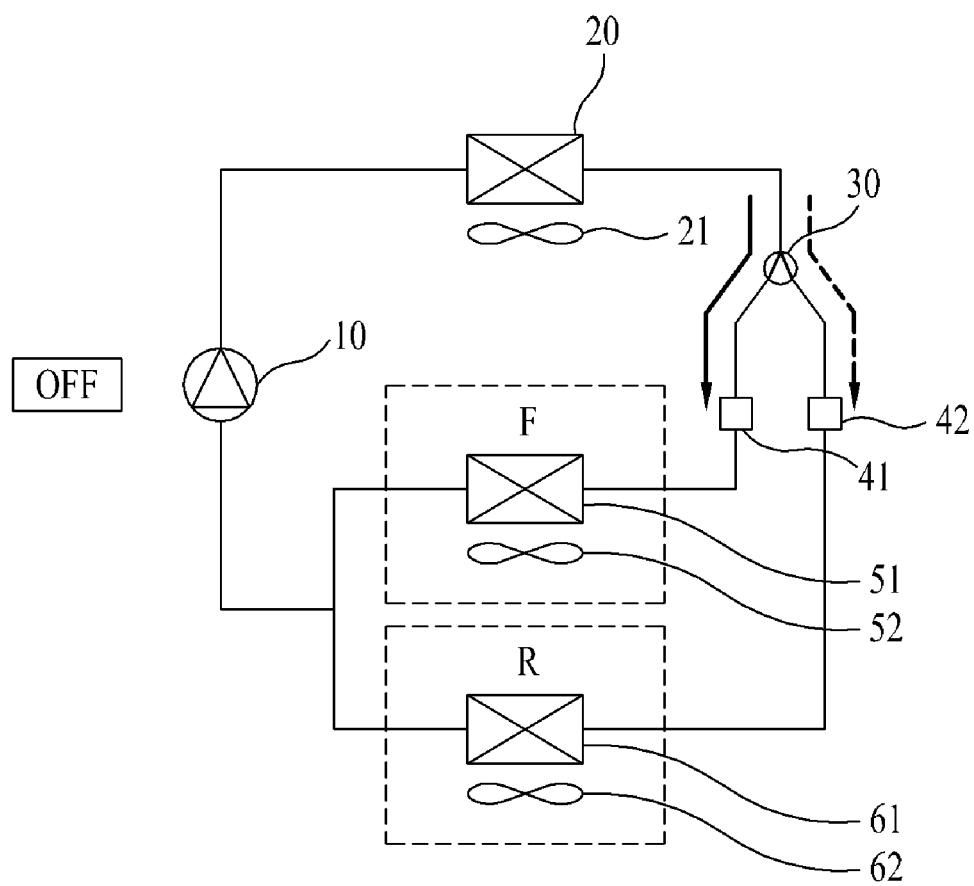

[Fig. 5]
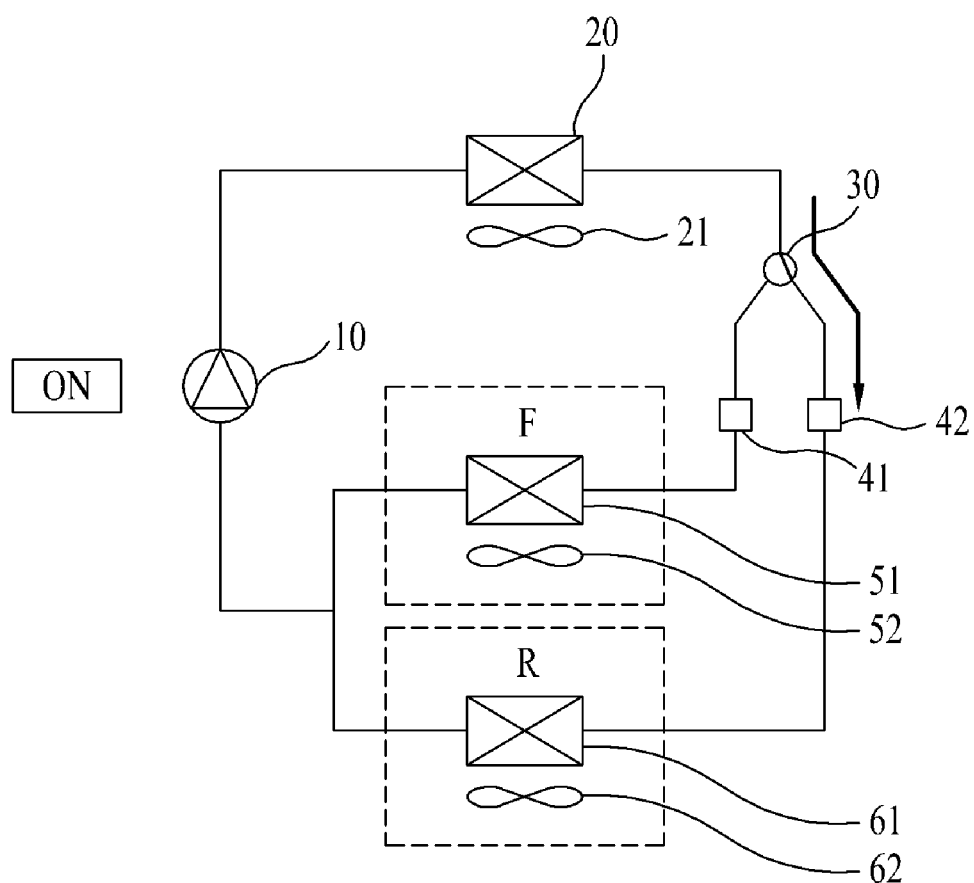

[Fig. 6]
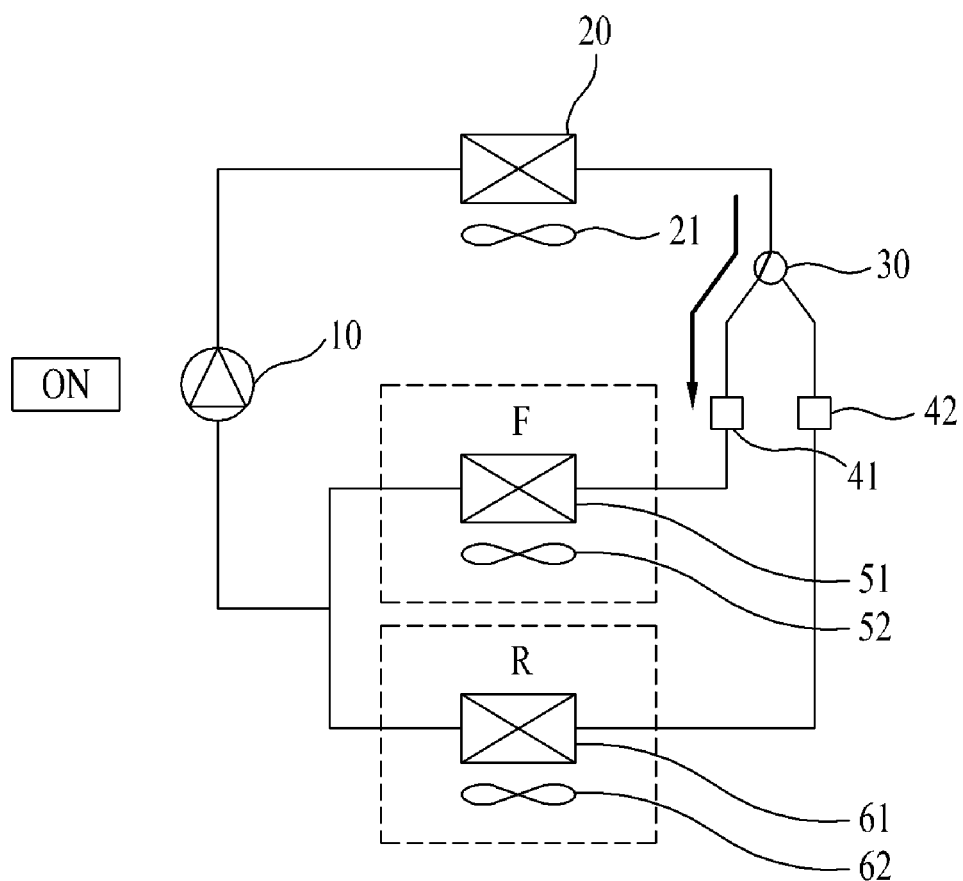

[Fig. 7]
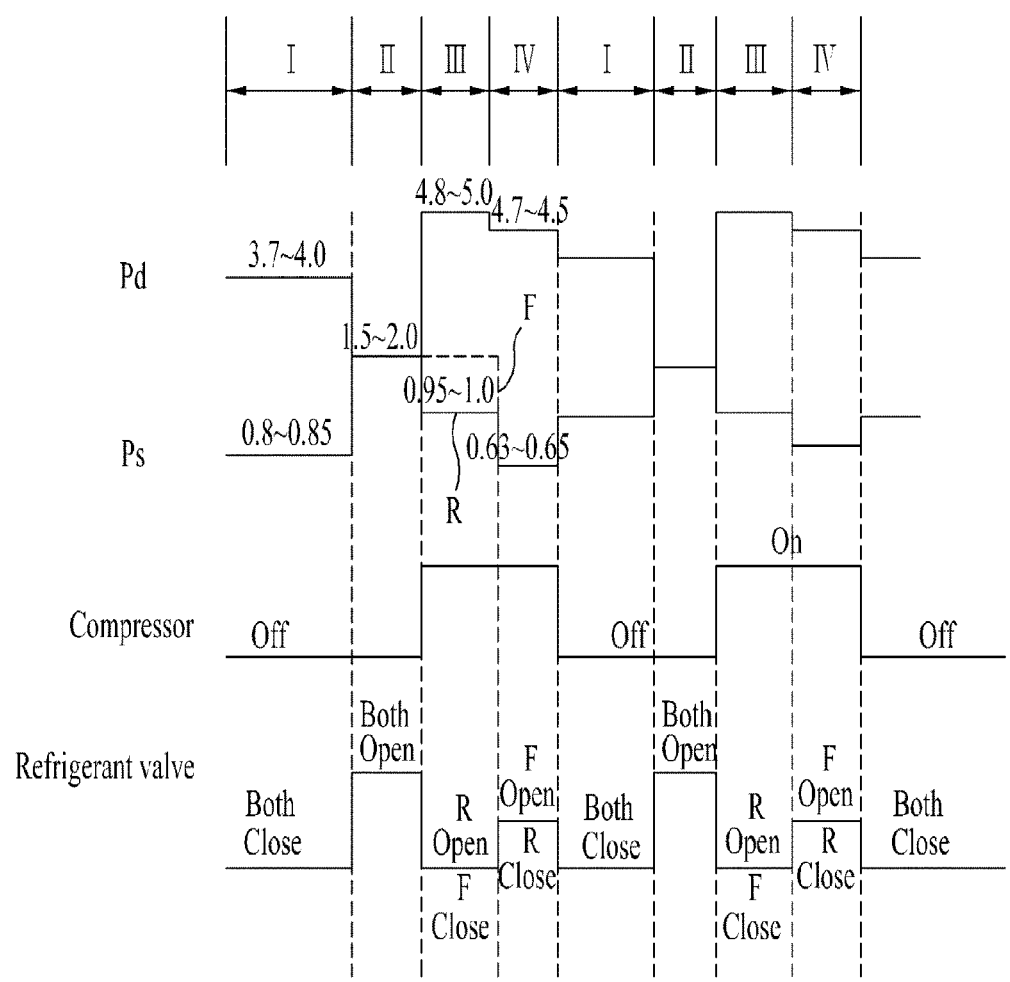

[Fig. 8]
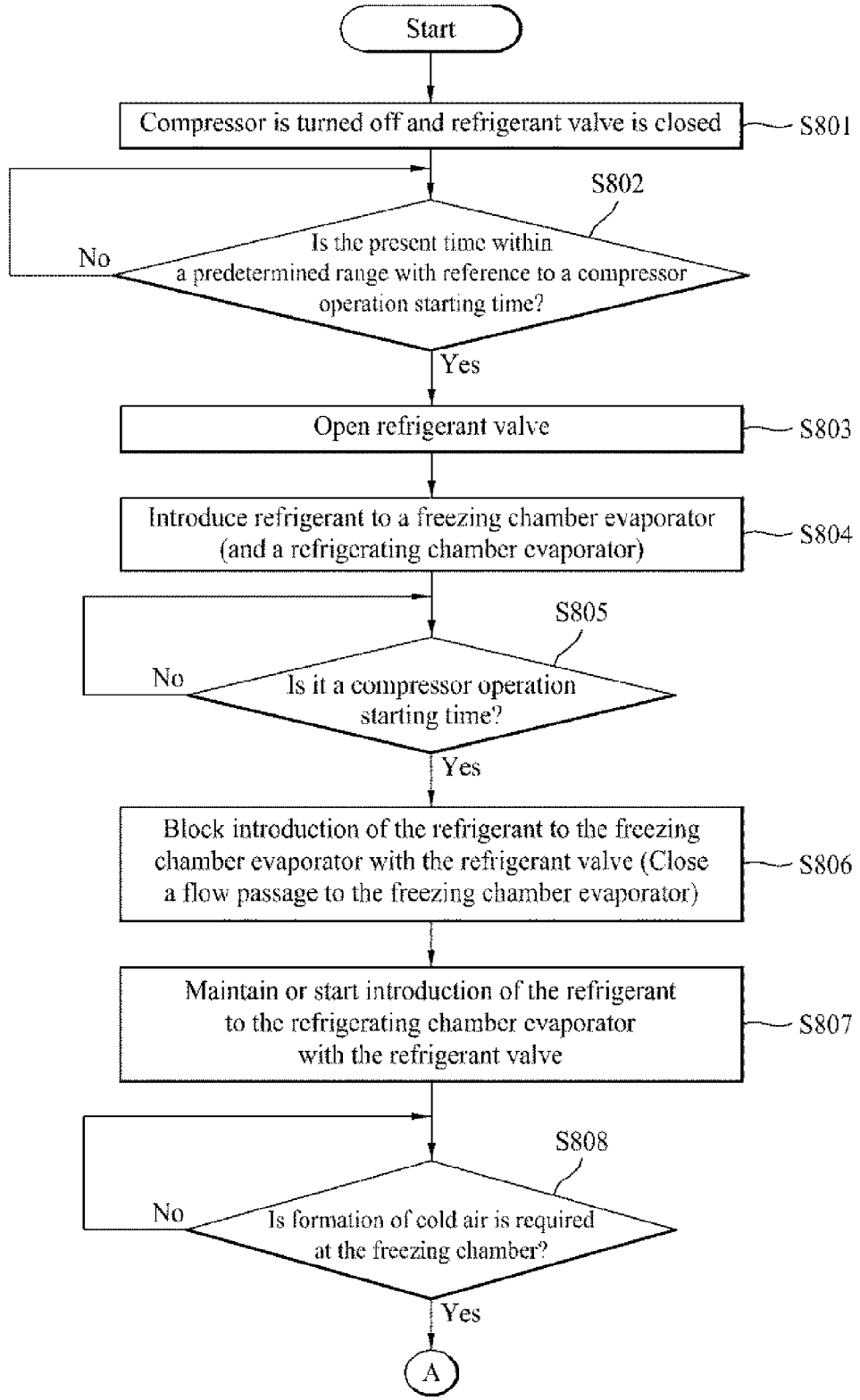

[Fig. 9]
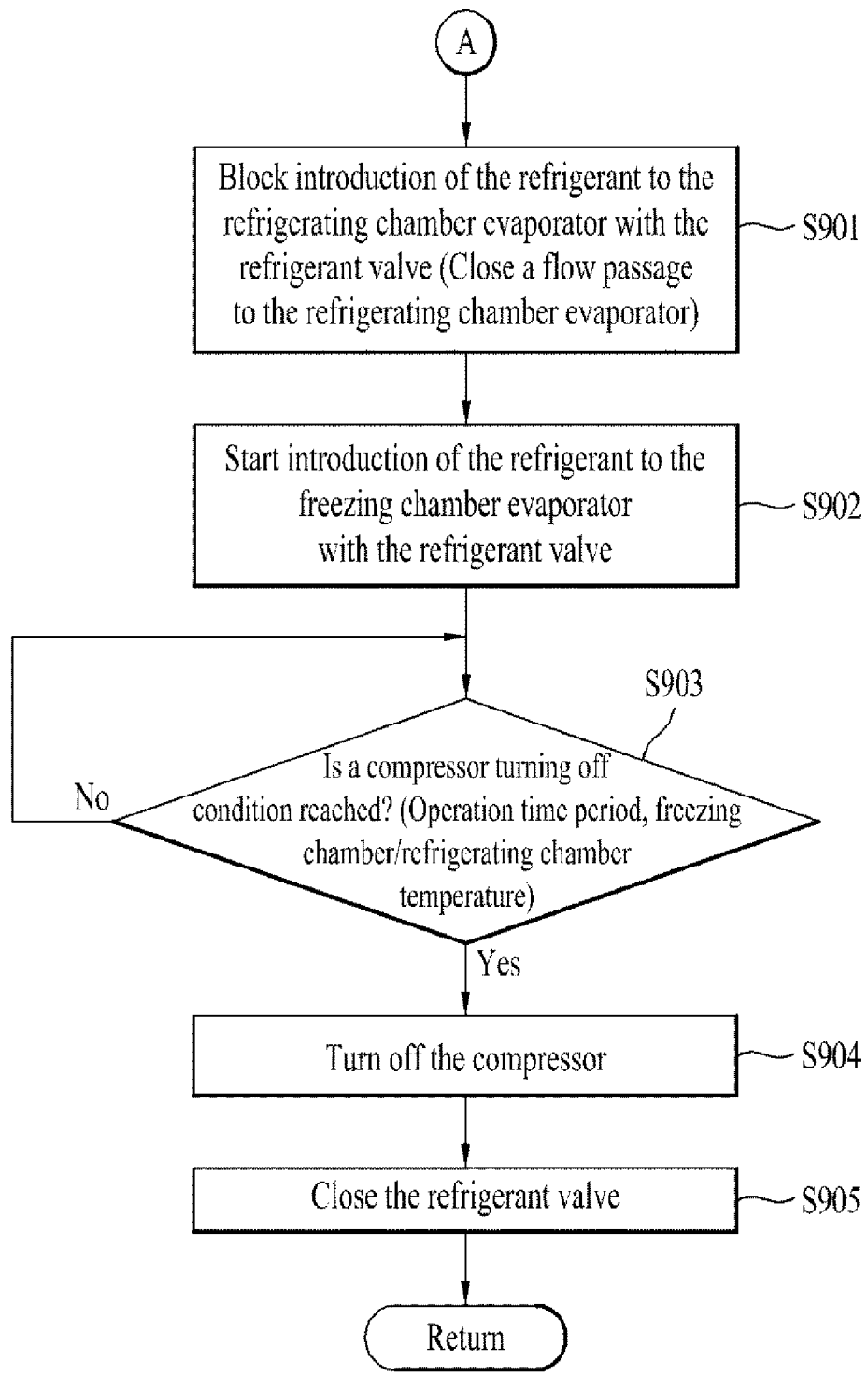

REFRIGERATOR AND METHOD FOR CONTROLLING THE SAME

TECHNICAL FIELD

The present invention relates to a refrigerator and a method for controlling a refrigerator, and more particularly to a refrigerator and a method for controlling a refrigerator in which unnecessary operation of a compressor is prevented for saving power consumption of the refrigerator.

BACKGROUND ART

The refrigerator is an appliance for refrigerated or frozen storage of storage things by means of a refrigerating cycle of compression, condensation, and evaporation. The refrigerator is provided with the compressor for compressing refrigerant, a condenser for condensing the refrigerant compressed thus, an expansion device for causing adiabatic expansion of the refrigerant condensed thus to drop a temperature of the refrigerant, and a heat exchanger connected to the expansion device for causing heat exchange between low temperature refrigerant and air.

In a case a storage chamber of the refrigerator is provided with a freezing chamber and a refrigerating chamber, it is preferable that the heat exchanger is provided to each of the freezing chamber and the refrigerating chamber for cooling the freezing chamber and the refrigerating chamber, independently.

The refrigerator with the independent cooling has a refrigerant valve for injecting the refrigerant to a freezing chamber evaporator and a refrigerating evaporator, alternately.

During operation of the refrigerator, the compressor is operated, not in 24 hours, but is turned on/off at regular intervals, and, in general, the refrigerant is introduced to the refrigerating chamber evaporator after a predetermined time period is passed after the refrigerant is introduced to the freezing chamber evaporator under the control of the refrigerant valve at the time the compressor is turned on.

DISCLOSURE OF INVENTION

Technical Problem

In the meantime, if evaporation of the refrigerant takes place at the refrigerating chamber evaporator after finishing evaporation of the refrigerant at the freezing chamber evaporator, since a vapor pressure of the refrigerating chamber evaporator is higher than a vapor pressure of the freezing chamber evaporator, it is difficult for the refrigerant to move from the freezing chamber evaporator to an inlet of the compressor due to the refrigerant in the refrigerating chamber evaporator.

If this problem takes place, shortage of the refrigerant takes place in operation of the compressor and evaporation at the refrigerating chamber/freezing chamber evaporator in a next time cycle due to refrigerant recovery problem at the compressor.

Accordingly, in order to prevent this problem from taking place, for recovering the refrigerant from the freezing chamber evaporator which is at a relatively low pressure, after a time period which is required for evaporation at the freezing chamber evaporator is passed, the refrigerant valve is closed for preventing the refrigerant valve from introducing the refrigerant from the expansion device to the freezing chamber evaporator (and the refrigerating chamber evaporator).

Then, the compressor is driven for a preset time period for drawing in the low pressure refrigerant from the freezing chamber evaporator which failed to move to the compressor in a previous cycle due to the high pressure refrigerant in the refrigerating chamber evaporator.

Operation of the compressor only for such recovery of the refrigerant regardless of formation of the cold air is called as Pump Down. Such operation causes a problem in that power is consumed regardless of formation of the cold air, i.e., the refrigerating operation and freezing operation.

Solution to Problem

Accordingly, the present invention is directed to a refrigerator.

An object of the present invention is to provide a refrigerator in which operation of the compressor in a time period not related to refrigerating operation or freezing operation is prevented, for saving power consumption.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a refrigerator having a compressor, a refrigerating chamber evaporator and a freezing chamber evaporator connected to the compressor, and a refrigerant valve for guiding refrigerant to the evaporators, includes the steps of (A) opening the refrigerant valve which is in a closed state for introducing the refrigerant to at least the freezing chamber evaporator (or a second evaporator) of the evaporators in a turned state of the compressor, (B) putting the compressor into operation and controlling the refrigerant valve for introducing the refrigerant into the refrigerating chamber evaporator and blocking introduction of the refrigerant to the freezing chamber evaporator, and (C) blocking introduction of the refrigerant to the freezing chamber evaporator for maintaining an inside pressure of the freezing chamber evaporator higher than an inside pressure of the refrigerating chamber evaporator for recovering the refrigerant from the freezing chamber evaporator during a time period in which the refrigerant is introduced to the refrigerating chamber evaporator in the step (B).

The step (A) includes the steps of (A-1) determining whether a difference between a compressor operation starting time and the present time before opening the refrigerant valve to determine whether the difference is within a predetermined range or not, and (A-2) if it is determined that the difference of the times is within the predetermined time range, opening the refrigerant valve such that the refrigerant remained at an inlet side of the refrigerant valve due to turning off of the compressor and closure of the refrigerant valve is introduced to the refrigerating chamber evaporator and the freezing chamber evaporator or only to the freezing chamber evaporator.

A time period in which the refrigerant valve is kept opened in the step A-2 is matched to a time period required for elevating the inside pressure of the refrigerating chamber evaporator to be higher than the inside pressure of the freezing chamber evaporator in the step (B).

The time period in which the refrigerant valve is kept opened is one minute to one minute thirty seconds.

The method further includes the step (D) of guiding introduction of the refrigerant to the freezing chamber evaporator by blocking the introduction of the refrigerant to the refrigerating chamber evaporator and opening introduction of the refrigerant to the freezing chamber evaporator with the refrigerant valve, if it is determined that it is required to stop introduction of the refrigerant to the refrigerating chamber evaporator during operation of the compressor.

A time period in which the refrigerant is kept introduced to the refrigerating chamber evaporator is provided longer than a time period in which the refrigerant remained in the freezing chamber evaporator is drawn into the compressor, entirely.

And, in another aspect of the present invention, a method for controlling a refrigerator having a first storage chamber, a second storage chamber having a temperature kept lower than the first storage chamber, a compressor, first and second evaporators connected to the compressor for forming cold air to be supplied to the first and second storage chambers respectively, and a refrigerant valve for guiding the refrigerant to the first and second evaporators, includes the steps of (1) controlling the refrigerant valve for supplying the refrigerant to the second evaporator to elevate an inside pressure of the second evaporator in a state the compressor is turned, (2) supplying the refrigerant to the first evaporator by putting the compressor into operation and controlling the refrigerant valve if supply of the refrigerant to the first storage chamber is required, and (3) in order to recover the refrigerant from the second evaporator during supply of the refrigerant to the first evaporator, controlling the refrigerant valve to block introduction of the refrigerant to the second evaporator for elevating the inside pressure of the second evaporator higher than the inside pressure of the first evaporator.

The step (1) includes the steps of opening the refrigerant valve for a predetermined time period before starting of the compressor such that the refrigerant remained at an inlet side of the refrigerant valve due to turning off of the compressor and closure of the refrigerant valve is introduced to the first evaporator and the second evaporator at a time or to the second evaporator.

The time period in which the refrigerant valve is kept opened in the step (1) is matched to a time period in which the inside pressure of the second evaporator is elevated higher than the inside pressure of the first evaporator formed in the step (2).

The method further includes the step (3) of guiding introduction of the refrigerant to the freezing chamber evaporator (or the second evaporator) by blocking the introduction of the refrigerant to the first evaporator and opening introduction of the refrigerant to the second evaporator with the refrigerant valve, if it is determined that it is required to stop introduction of the refrigerant to the second chamber evaporator during operation of the compressor.

A time period in which the refrigerant is kept introduced to the first evaporator is provided longer than a time period in which the refrigerant remained in the second evaporator is drawn into the compressor, entirely.

And, in another aspect of the present invention, a refrigerator includes a compressor, a refrigerating chamber evaporator and a freezing chamber evaporator connected to the compressor, a refrigerant valve for guiding refrigerant to the refrigerating chamber evaporator or the freezing chamber evaporator, and a control unit for controlling the refrigerant valve such that the refrigerant valve blocks or introduces the refrigerant to cause an inside pressure of the freezing chamber evaporator to be elevated higher than an inside pressure of the refrigerating chamber evaporator during evaporation at the refrigerating chamber evaporator for the compressor to draw in the refrigerant remained in the freezing chamber evaporator in which no evaporation takes place.

The control unit controls the refrigerant valve such that the refrigerant is introduced to the refrigerating chamber evaporator and the freezing chamber evaporator or to the freezing chamber evaporator at the time the compressor is turned off.

The control unit opens the refrigerant valve at the time the compressor is turned off in a time period required for the inside pressure of the freezing chamber evaporator to which the refrigerant is introduced at the time the compressor is turned off to be formed higher than the inside pressure of the refrigerating chamber evaporator to which the refrigerant is introduced at the time the compressor is in operation.

At the time the compressor is started to operate, the refrigerant valve is opened to the refrigerating chamber evaporator and closed to the freezing chamber evaporator, wherein the refrigerant valve is kept closed to the freezing chamber evaporator until the introduction of the refrigerant to the refrigerating chamber evaporator is finished such that the inside pressure of the freezing chamber evaporator is kept higher than the inside pressure of the refrigerating chamber evaporator for drawing refrigerant remained in the freezing chamber evaporator is drawn to the compressor, entirely.

In another aspect of the present invention, a refrigerator includes a compressor, a first storage chamber and a second storage chamber having a temperature maintained lower than the first storage chamber, a first evaporator for providing cold air to the first storage chamber and a second evaporator for providing the cold air to the second storage chamber, a refrigerant valve for guiding refrigerant to the first evaporator or the second evaporator, and a control unit for controlling the refrigerant valve such that the refrigerant valve blocks or introduces the refrigerant to cause an inside pressure of the second evaporator to be elevated higher than an inside pressure of the first evaporator during evaporation at the first evaporator for the compressor to draw in the refrigerant remained in the second evaporator in which no evaporation take place.

The control unit controls the refrigerant valve such that the refrigerant is introduced to the first evaporator and the second evaporator or the second evaporator at the time the compressor is turned off.

The control unit opens the refrigerant valve at the time of turning off of the compressor in a time period required for the inside pressure of the second evaporator to which the refrigerant is introduced at the time of turning off of the compressor to be higher than the inside pressure of the first evaporator to which the refrigerant is introduced at the time of operation of the compressor.

At the time the compressor starts to operate, the refrigerant valve is opened to the first evaporator and closed to the second evaporator, wherein the refrigerant valve is kept closed to the second evaporator until the introduction of the refrigerant to the first evaporator is finished such that the inside pressure of the second evaporator is kept higher than the inside pressure of the first evaporator for drawing the refrigerant remained in the second evaporator into the compressor, entirely.

It is to be understood that both the foregoing general description and the following detailed description of the present invention are exemplary and explanatory and are intended to provide further explanation of the invention as claimed.

Advantageous Effects of Invention

As has been described, the refrigerator and the method for controlling the same of the present invention have the following advantages.

The compressor may not be operated regardless of the cold air formation operation of the evaporator.

Eventually, since the pump down, i.e., operation of the compressor for drawing in the refrigerant remained in the freezing chamber evaporator (or the second evaporator) to the compressor can be dispensed with, power consumption required in the pump down can be saved.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 illustrates a schematic view of a refrigerator in accordance with a preferred embodiment of the present invention.

FIG. 2 illustrates a block diagram for controlling a refrigerator in accordance with a preferred embodiment of the present invention.

FIG. 3 illustrates a schematic view showing a state in which a compressor is turned off and a refrigerant valve is closed in a refrigerator in accordance with a preferred embodiment of the present invention.

FIG. 4 illustrates a schematic view showing a state in which a compressor is turned off and a refrigerant valve is opened in a refrigerator in accordance with a preferred embodiment of the present invention.

FIG. 5 illustrates a schematic view showing a refrigerating chamber evaporator (or a first evaporator) forms cold air in a refrigerator in accordance with a preferred embodiment of the present invention.

FIG. 6 illustrates a schematic view showing a freezing chamber evaporator (or a second evaporator) forms cold air in a refrigerator in accordance with a preferred embodiment of the present invention.

FIG. 7 illustrates a graph showing changes of pressures at an inlet and an outlet of a compressor according to operation of the compressor and a refrigerant valve in a refrigerator in accordance with a preferred embodiment of the present invention.

FIGS. 8 and 9 illustrate a flow chart showing the steps of a method for controlling a refrigerator in accordance with a preferred embodiment of the present invention.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

Referring to FIG. 1, the refrigerator in accordance with a preferred embodiment of the present invention includes a compressor 10 for compressing refrigerant, a condenser 20 connected to an outlet side of the compressor 10, a condenser fan 21 for dissipating heat from the condenser 20, a refrigerant valve 30 for blocking a refrigerant flow or shifting a refrigerant flow passage, first and second expansion devices 41 and 42 provided to branch pipes connected to an outlet side of the refrigerant valve 30, a refrigerating chamber evaporator 61, and a freezing chamber evaporator 51 connected to the first and second expansion devices 41 and 42, respectively.

It is preferable that the refrigerant valve 30 is a three-way valve for enabling to be in communication with the freezing chamber evaporator 51 and the refrigerating chamber evaporator 61.

The freezing chamber evaporator 51 is provided in the freezing chamber F and the refrigerating chamber evaporator is provided in the refrigerating chamber R. And, provided to the freezing chamber F and the refrigerating chamber R, there are a freezing chamber cooling air fan 52 and a refrigerating chamber cooling air fan 62 for moving cold air, respectively.

However, it is not necessary to sort the evaporators into the freezing chamber or the refrigerating chamber evaporators clearly, and the sorting of the evaporators can be applied if any one of a plurality of storage chambers has a temperature lower than the other storage chambers.

Moreover, this principle can be applicable to a plurality of refrigerating chambers.

Therefore, if there are a first storage chamber and a second storage chamber having a temperature lower than the first storage chamber, the evaporators can be sorted as a first evaporator for supplying cold air to the first storage chamber and a second evaporator for supplying the cold air to the second storage chamber.

Therefore, the refrigerating chamber evaporator (or the first evaporator) 61 can be replaced with the first evaporator, and the freezing chamber evaporator (or the second evaporator) 51 can be replaced with the second evaporator.

Moreover, the refrigerating chamber R can be a first storage chamber, the freezing chamber F can be a second storage chamber, the refrigerating chamber cooling air fan 62 can be a first cooling air fan, and the freezing chamber cooling air fan 52 can be a second cooling air fan.

It is apparent that the present invention having such elements replaced thus can also be within a scope of the present invention.

Referring to FIG. 2, there is a display unit 70 connected to an output terminal of a control unit 1, for displaying operation states of the compressor 10, the condenser fan 21, the refrigerant valve 30, the refrigerating chamber cooling air fan (or the first cooling air fan) 62, the freezing chamber cooling air fan (or the second cooling air fan) 52, and the refrigerator.

And, there are a power source unit 2 and an input unit 3 having a predetermined input buttons both provided to an input terminal of the control unit 1.

In this instance, the control unit 1 serves to control above elements for forming the cold air in the freezing chamber (or the second storage chamber) (See FIG. 1) and the refrigerating chamber (or the first storage chamber).

And, as described later, at the time an inside pressure of the freezing chamber evaporator (or the second evaporator) 51 is elevated higher than an inside pressure of the refrigerating chamber evaporator (the first evaporator) 61 (See FIG. 1) temporarily, for making the compressor 10 to draw in the remained refrigerant from the freezing chamber evaporator (or the second evaporator) 51, the control unit 1 controls an operation staring time and opening direction and time of the refrigerant valve 30.

FIG. 3 illustrates a schematic view of a state in which one cycle of operation of the compressor 10 is finished and the compressor 10 is turned off.

In this instance, the refrigerant valve 30 is closed not to introduce the refrigerant to the evaporators 51 and 61.

Accordingly, the refrigerant at a relatively high pressure is positioned at a region marked with an A from the compressor 10 to the refrigerant valve 30 through the condenser 20 mostly, and a portion of the refrigerant at a low pressure is positioned at regions except the A region.

FIG. 7 illustrates a graph showing changes of pressures at an inlet and an outlet of the compressor according to turn on/off states of the compressor and open states of the refrigerant valve in the refrigerator in accordance with a preferred embodiment of the present invention.

Referring to FIG. 7, in a state the compressor 10 is turned off and the refrigerant valve 30 is closed both to the freezing chamber evaporator (or the second evaporator) 51 and the refrigerating chamber evaporator (the first evaporator) 61 (Both close) as shown in FIG. 3, an outlet side pressure Pd of the compressor 10 is higher than an inlet side pressure Ps of the compressor 10, significantly (Step I).

The inlet side pressure Ps of the compressor 10 is similar to an inside pressure of the freezing chamber evaporator (or the second evaporator) 51 or the refrigerating chamber evaporator (the first evaporator) 61 both having the refrigerant to be introduced to the inlet side of the compressor 10 contained therein.

This is because the freezing chamber evaporator (or the second evaporator) 51 or the refrigerating chamber evaporator (the first evaporator) 61 is in communication with the inlet side of the compressor 10.

And, this is also because the refrigerant evaporated in the freezing chamber evaporator (or the second evaporator) 51 or the refrigerating chamber evaporator (the first evaporator) 61 is introduced to the inlet side of the compressor 10 without significant change of temperature or pressure in this state.

Therefore, an inside pressure change of the evaporators 51 and 61 will be described with reference to the inlet side pressure Ps of the compressor 10.

In the meantime, referring to FIG. 4, in a state shown in FIG. 3 (the compressor is in a turned off state), the refrigerant valve 30 is operated to introduce the refrigerant to the freezing chamber evaporator (or the second evaporator) 51.

In this instance, it is also made to introduce the refrigerant to the refrigerating chamber evaporator (the first evaporator) 61. However, since what is important is the introduction of the refrigerant to the freezing chamber evaporator (or the second evaporator) 51, the introduction of the refrigerant to the freezing chamber evaporator (or the second evaporator) 51 is required to be a core matter.

This is for elevating the inside pressure of the freezing chamber evaporator (or the second evaporator) 51 higher than the inside pressure of the refrigerating chamber evaporator (the first evaporator) 61. For this, a high pressure refrigerant is forwarded to the freezing chamber evaporator (or the second evaporator) 51 to mix with the refrigerant remained therein.

In this instance, since the refrigerant valve 30 is opened to at least one of the evaporators for introduction of the refrigerant while keeping the compressor 10 to be turned off, an entire refrigerating cycle is made to be in communication, causing the outlet side pressure and the inlet side pressure of the compressor 10 to become the same, substantially (Step II in FIG. 7).

In this instance, in order to introduce the refrigerant both to the freezing chamber evaporator (or the second evaporator) 51 and the refrigerating chamber evaporator (the first evaporator) 61, the refrigerant valve 30 is opened in both evaporator 51 and 61 directions (Refrigerant valve Both open in the step II, See FIG. 7).

However, it is preferable that opening of the refrigerant valve 30 in middle of a closed state is made a predetermined time period before starting of operation of the compressor 10.

If high temperature and high pressure refrigerant relative to the refrigerant remained in the freezing chamber evaporator (or the second evaporator) 51 and the refrigerating chamber evaporator (the first evaporator) 61 is introduced to the evaporators excessively, temperatures and inside pressures of the evaporators 51 and 61 can be elevated, significantly.

Therefore, it is preferable that a time period the refrigerant valve 30 is kept opened from opening of the refrigerant valve 30 to starting of the compressor 10 is matched to a time period required for the inside pressure of the freezing chamber evaporator (or the second evaporator) 51 to be elevated higher than the inside pressure of the refrigerating chamber evaporator (the first evaporator) 61 at the time the compressor in operation.

In detail, it is preferable that the required time period is 1 minute~1 minute and thirty seconds.

For an example, if the present time is thirty minutes past one o'clock, and the starting time of the compressor 10 is thirty-two minutes past one o'clock, since there are two minutes until starting of the compressor 10, the refrigerant valve 30 is not opened.

However, if the present time is thirty minutes and thirty seconds past one o'clock, or thirty-one minutes past one o'clock, since the time is one minute or one minute and thirty seconds before the starting time of the compressor 10, the refrigerant valve 30 is opened to introduce the refrigerant to the freezing chamber evaporator (or the second evaporator) 51.

This is for introducing the refrigerant from the freezing chamber evaporator (or the second evaporator) 51 of which pressure is higher than the refrigerating chamber evaporator (or the first evaporator) 61 to the compressor entirely in a case the compressor 10 is in operation and evaporation takes place only at the refrigerating chamber evaporator (or the first evaporator) 61 for forming cold air.

According to this, the refrigerant is introduced from the freezing chamber evaporator (or the second evaporator) 51 which does not make any cold air forming action presently to the compressor 10 again and utilized in the refrigeration cycle.

Referring to FIG. 4, if formation of the cold air is required at the refrigerating chamber (or the first storage chamber) R, if the compressor 10 is put into operation, the refrigerant valve 30 is opened for introducing the refrigerant in a refrigerating chamber evaporator (or the first evaporator) direction (Step III in FIG. 7, the refrigerant valve is in a R open state).

Then, the refrigerating chamber cooling air fan (or the first cooling air fan) 62 is come into operation for supplying the cold air to the refrigerating chamber (or the first storage chamber) R.

In this instance, since the refrigerant valve 30 is closed in a freezing chamber evaporator (or the second evaporator)

direction, no refrigerant is introduced in the freezing chamber evaporator (or the second evaporator) direction (Step III in FIG. 7, the refrigerant valve is in an F close state).

Formation of the cold air takes place at the refrigerating chamber evaporator (or the first evaporator) 61 owing to evaporation of the refrigerant and heat exchange of the air, but not at the freezing chamber evaporator (or the second evaporator) 51.

Therefore, since the temperature of the refrigerating chamber evaporator (or the first evaporator) 61 is lower than the temperature of the freezing chamber evaporator (or the second evaporator) 51, the inside pressure of the refrigerating chamber evaporator (or the first evaporator) 61 is lower than the inside pressure of the freezing chamber evaporator (or the second evaporator) 51.

This is because the inside pressure of the refrigerating chamber evaporator (or the first evaporator) 61 is dropped by the evaporation even though the inside of the freezing chamber evaporator (or the second evaporator) 51 is influenced by the high pressure refrigerant introduced thereto during the compressor is turned off.

Under this reason, the refrigerant is introduced to the compressor 10 from the freezing chamber evaporator (or the second evaporator) 51 prior to the refrigerating chamber evaporator (or the first evaporator) 61.

If the refrigerant moves from the freezing chamber evaporator (or the second evaporator) 51 to the compressor 10, causing the pressure of the freezing chamber evaporator (or the second evaporator) 51 to drop lower than the pressure of the refrigerating chamber evaporator (or the first evaporator) 61, starting from this time, the refrigerant is drawn into the compressor from an inside of the refrigerating chamber evaporator (or the first evaporator) 61.

Referring to the step III in a graph illustrating the Ps changes in FIG. 7, there are a dashed line marked with F and a solid line marked with R, wherein the F is higher than R.

This indicates that the inside pressure (marked with R) of the refrigerating chamber evaporator (or the first evaporator) under formation of the cold air is lower than the inside pressure of the freezing chamber evaporator (or the second evaporator) (marked with F) not under formation of the cold air.

By forming a pressure difference thus artificially, different from the related art in which additional operation of the compressor is required only for drawing in the refrigerant, by drawing in the refrigerant remained in the freezing chamber evaporator (or the second evaporator) 51 to the compressor 10 without any additional operation of the compressor, shortage of the refrigerant can be prevented.

Since a time period for forming the cold air at the refrigerating chamber evaporator (or the first evaporator) 61 is a ten and a few minutes to a few ten minutes, the drawing in of the refrigerant remained in the freezing chamber evaporator (or the second evaporator) 51 to the compressor 10 can be made within the time period, adequately.

In the meantime, referring to FIG. 6, a requirement for cutting off the refrigerant introduction to the refrigerating chamber evaporator (or the first evaporator) 61 takes place due to formation of an environment, such as the inside temperature of the refrigerating chamber (or the first storage chamber) R reaches to a lower limit, or the like.

And, if introduction of the refrigerant to the freezing chamber evaporator (or the second evaporator) 51 is required for supplying the cold air to the freezing chamber (or the second storage chamber) F, the refrigerant valve 30 blocks a flow passage to the refrigerating chamber evaporator (or the first evaporator) 61 (Step IV in FIG. 7, the refrigerant valve is in a R close state), and opens a flow passage to the freezing chamber evaporator (or the second evaporator) 51 (The refrigerant valve is in an F open state).

And, if a condition something like the inside temperature of the freezing chamber F reaches to a lower limit is met, the compressor 10 is turned off, requiring no more formation of the cold air at the freezing chamber evaporator (or the second evaporator) 51.

Accordingly, the compressor 10 stops operation, and the refrigerant valve 30 blocks the introduction of the refrigerant to the refrigerating chamber evaporator (or the first evaporator) 61 and the freezing chamber evaporator (or the second evaporator) 51 (Step I in FIG. 7, the refrigerant valve 30 is in a Both close state).

Referring to FIG. 7, in the step I, the compressor is in a turned off state, and the refrigerant valve 30 is also in closed states to all of the evaporators. According to this, a difference of inside pressures takes place between the inlet side and the outlet side of the refrigerant valve 30.

In detailed numerical values, the outlet side pressure of the compressor in the step I is about 3.7~4.0 bar. And, the inlet side pressure of the compressor (substantially the same with the pressure of the evaporators) is about 0.9~0.95 bar.

Then, if the refrigerant valve 30 is opened in all evaporator directions while the compressor maintains a turned off state in the step II, making all pressures in the cycle the same, the outlet side pressure of the compressor and the inlet side pressure of the compressor (evaporator pressure) becomes in a range of about 1.5~2.0 bar.

And, in the step III, the compressor is turned on, and the refrigerant valve is opened in a refrigerating chamber evaporator (or the first evaporator) direction (R open), and blocked in a freezing chamber evaporator (or the second evaporator) direction (F close).

Owing to this, even though the inside pressure of the freezing chamber evaporator (or the second evaporator) is maintained the same with 1.5~2.0 bar in the step II, the inside pressure of the refrigerating chamber evaporator (or the first evaporator) becomes in a range of about 0.95~1.0 bar as the inside pressure of the refrigerating chamber evaporator (or the first evaporator) is dropped by evaporation for forming the cold air.

Such a pressure difference causes the refrigerant drawn into the compressor from the inside of the freezing chamber evaporator (or the second evaporator) prior to the refrigerant in the refrigerating chamber evaporator (or the first evaporator). In this instance, check valves on pipes connected to the outlets of the evaporators block introduction of the refrigerant from the evaporator which is at higher pressure to the evaporator which is at lower pressure.

In the meantime, after formation of the cold air is finished at the refrigerating chamber, in order to start formation of the cold air at the freezing chamber, an open direction of the refrigerant valve is changed in middle of operation of the compressor like the step IV.

According to this, the refrigerant valve is blocked in the refrigerating chamber evaporator (or the first evaporator) direction (R close) and opened in the freezing chamber evaporator (or the second evaporator) direction (F close). And, the freezing chamber cooling air fan comes into operation, to introduce the cold air into the freezing chamber. And, upon finishing the step IV, the step I state comes again.

Above operation will be summarized by using a flow chart.

Referring to FIG. 8, in a state the compressor is turned off and the refrigerant valve is closed, i.e., in a state introduction of the refrigerant to the refrigerating chamber evaporator (or the first evaporator) and the freezing chamber evaporator (or the second evaporator) are blocked (S801), the present time is compared to a compressor operation starting time, to determine whether the present time is within a predetermined time range or not (S802).

This is for determining a time for introducing the high pressure and high temperature refrigerant remained in an inlet side of the refrigerant valve to the freezing chamber evaporator (or the second evaporator) {and the refrigerating chamber evaporator (or the first evaporator)} during the compressor is turned off.

As a result of the determination, if it is determined that the present time is before a predetermined time range of starting operation of the compressor, the refrigerant valve is opened (S803). Accordingly, the refrigerant is introduced to the freezing chamber evaporator (or the second evaporator) {and the refrigerating chamber evaporator (or the first evaporator)} (S804).

Accordingly, the inside pressure of the freezing chamber evaporator (or the second evaporator) {and the refrigerating chamber evaporator (or the first evaporator)} is elevated.

In this state, it is determined whether the present time is the compressor operation starting time or not (S805), if it is determined that the present time is the compressor operation starting time, the refrigerant valve is operated to block introduction of the refrigerant to the freezing chamber evaporator (or the second evaporator) {That is, the flow passage to the freezing chamber evaporator (or the second evaporator) is blocked} (S806).

Then, a refrigerant introducing state to the refrigerating chamber evaporator (or the first evaporator) is maintained or started {That is, the flow passage to the refrigerating chamber evaporator (or the first evaporator) is opened (S807)}. And, the refrigerating chamber cooling air fan is come into operation for introducing the cold air formed by the refrigerating chamber evaporator (or the first evaporator) to the inside of the refrigerating chamber.

In this state, alike the step III in FIG. 7, since the inside pressure F of the freezing chamber evaporator (or the second evaporator) is higher than the inside pressure R of the refrigerating chamber evaporator (or the first evaporator), the refrigerant can be drawn from the inside of the freezing chamber evaporator (or the second evaporator) to the compressor, causing most of, or entire refrigerant is drawn from the inside of the freezing chamber evaporator (or the second evaporator) to the compressor.

Under this state, it is determined whether formation of the cold air at the refrigerating chamber is required no more or not, and formation of the cold air at the freezing chamber is required or not (S808).

As a result of the determination, if determined required, the refrigerant valve is put into operated again, to block the introduction of the refrigerant to the refrigerating chamber evaporator (or the first evaporator) {That is, the flow passage to the refrigerating chamber evaporator (or the first evaporator) is closed} (S901).

And, the refrigerant valve is opened to the freezing chamber evaporator (or the second evaporator) for introduction of the refrigerant to the freezing chamber evaporator (or the second evaporator). {That is, the flow passage to the freezing chamber evaporator (or the second evaporator) is opened} (S902).

And, the freezing chamber cooling air fan (or the second cooling air fan) is put into operation, for introducing the cold air formed by the freezing chamber evaporator (or the second evaporator) to the inside of the freezing chamber (or the second storage chamber).

After a certain time period is passed after the formation of the cold air takes place for cooling the freezing chamber (or the second storage chamber), whether a compressor turn off condition is met or not is determined owing to completion of a compressor operation time period or meeting a temperature condition of the freezing chamber (or the second storage chamber) or the refrigerating chamber (or the first storage chamber) (S903).

Accordingly, if it is determined that the compressor operation time period is completed, or the inside temperature of the freezing chamber (or the second storage chamber) or the refrigerating chamber (or the first storage chamber) meets a predetermined temperature condition, the compressor is turned off (S904).

Then, the refrigerant valve is closed, preventing the refrigerant from introducing to the freezing chamber evaporator (or the second evaporator) and the refrigerating chamber evaporator (or the first evaporator) (S905).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for controlling a refrigerator having a compressor, a refrigerant valve connected to the compressor for guiding refrigerant from the compressor, and a refrigerating chamber evaporator and a freezing chamber evaporator provided to branch pipes connected to an outlet side of the refrigerant valve, comprising:
   (A) a step of turning off the compressor and closing the refrigerant valve for blocking the refrigerant to the freezing chamber evaporator and the refrigerating chamber evaporator;
   (B) a step of controlling the refrigerant valve for introducing the refrigerant to the freezing chamber evaporator during a turn off state of the compressor; and
   (C) a step of putting the compressor into operation, and controlling the refrigerant valve for introducing the refrigerant into the refrigerating chamber evaporator and for blocking the refrigerant to the freezing chamber evaporator for maintaining an inside pressure of the freezing chamber evaporator higher than an inside pressure of the refrigerating chamber evaporator, such that the refrigerant from the freezing chamber evaporator is collected,
   wherein the step (B) includes the steps of:
      (B-1) determining whether or not a present time is within a predetermined time range from a compressor operation starting time, and
      (B-2) when the present time is within the predetermined time range, opening the refrigerant valve to introduce the refrigerant, the refrigerant remained at an inlet side of the refrigerant valve due to turning off of the compressor and closure of the refrigerant valve, only to the freezing chamber evaporator.

2. The method as claimed in claim 1, wherein the predetermined time range in which the refrigerant valve is kept opened in the step (B-2) is a time period required for elevating the inside pressure of the freezing chamber evaporator to be higher than the inside pressure of the refrigerating chamber evaporator in the step (C).

3. The method as claimed in claim 2, wherein the predetermined time range is one minute to one minute thirty seconds.

4. The method as claimed in claim 1, further comprising:
(D) a step of controlling the refrigerant valve to block the introduction of the refrigerant to the refrigerating chamber evaporator and to open introduction of the refrigerant to the freezing chamber evaporator if stopping introduction of the refrigerant to the refrigerating chamber evaporator is required during operation of the compressor.

5. The method as claimed in claim 1, wherein a time period in which the refrigerant is kept introduced to the refrigerating chamber evaporator in the step (C) is provided longer than a time period in which the refrigerant remained in the freezing chamber evaporator is drawn into the compressor, entirely.

6. A method for controlling a refrigerator having a first storage chamber, a second storage chamber having a temperature kept lower than the first storage chamber, a compressor, a refrigerant valve connected to the compressor, and first and second evaporators provided to branch pipes connected to an outlet side of the refrigerant valve for forming cold air to be supplied to the first and second storage chambers respectively, wherein the refrigerant valve is for guiding the refrigerant to the first and second evaporators, the method comprising:
(1) a step of turning off the compressor and closing the refrigerant valve for blocking the refrigerant to the second evaporator and the first evaporator;
(2) a step of controlling the refrigerant valve to supply the refrigerant to the second evaporator to elevate an inside pressure of the second evaporator in a state the compressor is turned off;
(3) a step of controlling the refrigerant valve to supply the refrigerant to the first evaporator if supply of the refrigerant to the first storage chamber is required with putting the compressor into operation; and
(4) a step of controlling the refrigerant valve to block introduction of the refrigerant to the second evaporator for elevating the inside pressure of the second evaporator higher than the inside pressure of the first evaporator in order to recover the refrigerant from the second evaporator during the step (3),
wherein the step (2) includes the step of controlling the refrigerant valve to supply the refrigerant, remained at an inlet side of the refrigerant valve due to turning off of the compressor and closure of the refrigerant valve, only to the second evaporator for a predetermined time period before starting of the compressor.

7. The method as claimed in claim 6, wherein the time period in which the refrigerant valve is kept opened in the step (4) is a time period in which the inside pressure of the second evaporator is elevated higher than the inside pressure of the first evaporator formed in the step (3).

8. The method as claimed in claim 6, further comprising:
(5) a step of controlling the refrigerant valve to guide introduction of the refrigerant to the second evaporator and to block the introduction of the refrigerant to the first evaporator, if stopping introduction of the refrigerant to the first evaporator is required during operation of the compressor.

9. The method as claimed in claim 6, wherein a time period in which the refrigerant is kept introduced to the first evaporator in the step (3) is provided longer than a time period in which the refrigerant remained in the second evaporator is drawn into the compressor entirely.

10. A refrigerator comprising:
a compressor;
a refrigerating chamber evaporator and a freezing chamber evaporator;
refrigerant valve for guiding refrigerant to the refrigerating chamber evaporator or the freezing chamber evaporator; and
a control unit controlling the refrigerant valve and the compressor,
wherein the control unit controls:
the compressor being turned off and the refrigerant valve to block the refrigerant to the freezing chamber evaporator and the refrigerating chamber evaporator;
the refrigerant valve to introduce the refrigerant to the freezing chamber evaporator in a state the compressor is turned off; and
the compressor to be turned on and the refrigerant valve to block the refrigerant to the freezing chamber evaporator and to introduce the refrigerant to the refrigerating chamber evaporator to cause an inside pressure of the freezing chamber evaporator to be elevated higher than an inside pressure of the refrigerating chamber evaporator during evaporation at the refrigerating chamber evaporator for the compressor to draw in the refrigerant remained in the freezing chamber evaporator, and
wherein the control unit controls the refrigerant valve such that the refrigerant is introduced only to the freezing chamber evaporator at the time the compressor is turned off.

11. The refrigerator as claimed in claim 10, wherein at the time the compressor is started to operate, the refrigerant valve is opened to the refrigerating chamber evaporator and closed to the freezing chamber evaporator, and
wherein the refrigerant valve is kept closed to the freezing chamber evaporator until the inside pressure of the freezing chamber evaporator is kept higher than the inside pressure of the refrigerating chamber evaporator for drawing refrigerant remained in the freezing chamber evaporator is drawn to the compressor, entirely.

* * * * *